United States Patent
Gwyn, Jr.

[15] 3,667,110
[45] June 6, 1972

[54] BONDING METALS WITHOUT BRAZING ALLOYS

[72] Inventor: Childress B. Gwyn, Jr., Wethersfield, Conn.

[73] Assignee: Contacts Incorporated, Wethersfield, Conn.

[22] Filed: Nov. 3, 1969

[21] Appl. No.: 873,721

[52] U.S. Cl. ................................................. 29/494, 29/488
[51] Int. Cl. .................................... B23k 31/02, B23k 35/38
[58] Field of Search ...................... 29/488, 492, 494, 498, 497

[56] References Cited

UNITED STATES PATENTS

| | | | |
|---|---|---|---|
| 2,187,844 | 1/1940 | Scharschu | 29/488 X |
| 2,776,472 | 1/1957 | Mesick, Jr. | 29/492 X |
| 3,165,828 | 1/1965 | Kennedy | 29/488 X |
| 3,180,022 | 4/1965 | Briggs et al. | 29/492 X |
| 3,367,020 | 2/1968 | Watson | 29/488 X |
| 3,372,471 | 3/1968 | Kuhn | 29/492 X |
| 3,417,461 | 12/1968 | Wells et al. | 29/498 X |
| 3,469,301 | 9/1969 | Freyberger et al. | 29/492 X |

FOREIGN PATENTS OR APPLICATIONS

| | | | |
|---|---|---|---|
| 478,363 | 11/1951 | Canada | 29/488 |
| 847,373 | 9/1960 | Great Britain | 29/488 |
| 540,961 | 11/1941 | Great Britain | 29/492 |

OTHER PUBLICATIONS

Garrett et al., " Broad Applications of Diffusion Bonding," NASA- CR- 409, 3/25/66, pp., 23, 84- 89.

*Primary Examiner*—John F. Campbell
*Assistant Examiner*—Ronald J. Shore
*Attorney*—Marn & Jangarathis

[57] ABSTRACT

Excellent bonds between usually-brazed metals are obtained, without brazing or soldering alloys, by initially oxidizing the surfaces to be bonded and then bonding in a reducing atmosphere at a temperature below the melting point of either metal. If the metals form a eutectic, bonding will be carried out above the eutectic temperature. It is believed that the oxidation-reduction cycle produces a perfectly clean or nascent surface which facilitates bonding. Yields are improved by initially providing a very thin plated coating of silver, copper or nickel, or combinations thereof, on one workpiece.

18 Claims, No Drawings

3,667,110

BONDING METALS WITHOUT BRAZING ALLOYS

BACKGROUND OF THE INVENTION

This invention relates generally to bonding metals and, more particularly, it relates to bonding metals in the absence of any intermediate soldering, brazing or welding metal or alloy. Generally, but not necessarily, bonding in accordance with the invention also takes place in the absence of any significant mechanical pressure, i.e. the "clamping force" required to bond metals by ultrasonic or thermocompression techniques. The method of the invention is particularly applicable to the bonding of metals or alloys which form a eutectic composition, i.e. an intermediate composition of lower melting point than either of the workpieces. However, as will become clear from the detailed description of embodiments set forth below, workpieces of non-eutectic forming materials (most commonly two workpieces of the same metal) may be bonded after a plating step.

A summary of all prior art that could be considered relevant to the present invention is not necessary. However, the invention will be hereinbelow described with primary reference to the production of composite electrical contacts — commonly a steel or copper rivet with a silver or silver alloy facing on the head — and a discussion of prior art methods of producing such contacts will be illuminating.

Composite type contacts have been produced by one, or a combination of conventional soldering, brazing, welding, cold bonding, mechanical interlocking or other techniques. In many instances the resultant composite contacts were characterized by early failures, due to delaminations brought about through thermal, electrolytic, mechanical or other separating forces. In still other instances of failure, brazing or intra-layer bonding materials deleteriously coated and/or alloyed with the active (working) contact facing material to a degree sufficient to cause open circuit, high surface resistance, contact welding, radio interference and other undesirable effects.

Typically, a two component composite electrical contact is comprised of a rivet body of steel or copper and a contact working face of fine silver. This is produced by placing and positioning the rivet body in a suitable fixture, placing a sufficient amount of a brazing material upon the upper surface of rivet and superimposing thereon a disc of fine silver. These three positioned components are then subjected to a suitable temperature-time cycle in a satisfactory ambient atmosphere, thereby brazing the component parts together.

Although the interfacial union of the silver to the steel may be of sufficient mechanical strength, it often leaves much to be desired in intra-body electrical and/or thermal capacity and conductivity.

In addition to requiring the pre-placement of the three materials comprising the silver working face, the brazing material required is often expensive and requires careful alloying and/or costly working to obtain a desired shape, size, thickness and composition. Such solder or brazing "preforms" are widely sold. Likewise if three or more components are to be united by brazing, a total of five parts must be placed or positioned—for example a silver working face, a brazing material, a main body member, a second brazing material, and a second silver working face. Prior to even the elaborate positioning steps of the prior art, it has always been emphasized that for successful brazing the interfaces to be joined must be made as clean as possible, through chemical, mechanical, or other action and, most especially, that the parts must be free of all oxides. These, and other problems of the prior art are obviated when the teachings of the present invention are employed.

OBJECTS OF THE INVENTION

It is a general object of the present invention to provide a novel and superior method of joining metals without using intermediate bonding materials.

Various other objects and advantages of the invention will become clear from the following description of embodiments thereof, and the novel features will be particularly pointed out in connection with the appended claims.

DESCRIPTION OF EMBODIMENTS

In its simplest aspect, the present invention comprises the joining of two workpieces made of metals which form a eutectic. No cleaning procedures, other than perhaps removal of gross dirt or grease, are required. Initially one or both parts (or surfaces) to be bonded are intentionally oxidized, merely by heating them for a sufficient time in air. The oxidation cycle of silver plated copper, for example, may vary from 5 hours at 450° F. to 45 minutes at 1,000° F. Thereafter, the surfaces to be bonded are juxtaposed (without any clamping pressure being necessary) and the oxidized assembly is again heated, this time in a reducing atmosphere and at a temperature above the eutectic temperature but below the melting point of either workpiece. Appropriate time-temperature cycles must be worked out with care for each material system. Generally, if the bonding cycle is too intense, too much liquid phase will result and filleting and other problems common to brazing will result. If the cycle is not intense enough, bonds will be weak. The bonded workpieces are then cooled in a protective atmosphere to avoid surface reoxidation. The "intensity" of an oxidation or reduction cycle means the product of time and temperature.

It is of interest to note that certain hot cladding processes have taught heating the workpieces to a temperature between the recrystallization temperature of one workpiece and the melting point of either workpiece, but (1) a 30–50 percent reduction by rolling was required to squeeze the metals together, and (2) cladding had to be preceded by scratch-brushing and other cleaning procedures.

Thus, the present invention comprises mainly the steps of oxidation, positioning and reduction. Reduction heating must of course be last, but the order of the first two steps is not important, at least with relatively small parts. Since generally only one workpiece is oxidized, this will be the first step in most instances.

The idea of intentionally oxidizing parts immediately prior to bonding them is inimical to every known concept of bonding, since surface oxides have long been considered the prime factor behind weak, delaminated or absent bonds. The oxidation step of the present invention is therefore highly unusual, and some explanation or rationalization should be attempted, it being understood that the invention is not to be limited to any particular theory or explanation.

Any metallic surface will ordinarily present myriad barriers to successful bonding. It will be dirty (dust and grease), it will contain inclusions (impurities) and it will have oxides, both those of the parent material and of the impurities. If the parent material is one of the so-called film-forming metals such as aluminum or titanium, it will have an overall oxide film. In addition to the foregoing, there will be gases and other materials adsorbed on the surface. Conventionally, elaborate cleaning procedures are employed to remove these contaminants. It is believed that the oxidation of a surface must proceed by the diffusion of an oxygen-containing material through whatever is on the surface, including oxide films, until the base metal is reached. When this happens, oxide is formed. As oxidation proceeds, then, the metal-oxide interface may be considered to grow away from the original surface, which can be considered stationary. The original surface may have been dirty metal or an oxide, but the metal at the metal-oxide interface (originally within the bulk metal) is pure. Considered another way, it might be said that oxidation lifts everything on the original surface away from the metal, and that the metal underlying the oxide layer is completely clean.

Reduction follows. When the oxidized surface is exposed to a reducing atmosphere and an appropriate temperature, what happens is believed to be something other than the reverse of oxidation. It is believed that the oxide layer is physically removed, oxygen atoms, metal atoms and all, rather than merely the reverse of the oxidation reaction. With the removal of the oxide layer, the original, offending (bond-resistant) surface is also removed, and what is left is the often-sought but seldom achieved "nascent" surface of pure metal, which will bond readily even in the solid state, if the workpieces are maintained at temperature for a sufficient time. Such a surface, it is felt, when contigious to another such surface, will present a diffusion barrier approaching that of a grain boundary. Under such conditions, bonding will obviously be facilitated.

It is difficult to say whether a liquid phase will be present in the bond region in every instance when bonding according to the invention. It is, of course, possible to produce bonds without any liquid phase, but the bonds are generally weaker and the bonding cycles are much longer. For example, bonds can be made between silver and oxidized, silver-plated copper, or between oxidized Conmet No. 4 (75% Ag, 24.5% Cu, 0.5% Ni) and non-oxidized copper, but at 1,300° F. the bonding cycle takes 3 hours. This compares with 7 minutes at 1,475° F. Thus, the liquid phase system is obviously preferred for economic reasons. Under the reducing conditions of the bonding cycle, however, it is felt that the nascent condition of the bond surfaces is more of a factor in generating a good bond than the presence or absence of a liquid phase. It is felt that the surface activity of such a surface must be very high, and that the ability of such a surface to form a bond, whether it be by alloying, diffusion, impregnation or whatever, is much better than if the surface is in a stable (i.e. non-nascent) state.

The bonding cycles are generally so short that only a very thin film of liquid phase would be formed in any event. By carrying out the bonding cycle in jigs or holders that are non-wettable or alloyable with the workpieces, no problems such as sticking etc. are encountered. Ceramic or carbon jigs are generally employed.

If the foregoing theory is correct, the oxidation — reduction cycle may be considered an improved cleaning procedure, one that produces a truly nascent surface that will bond easily. The heretofore-mentioned use of eutectic-forming workpieces provides a practical and economic method of actually bonding. As diffusion across the interface is rapid, a small quantity of a liquid phase of eutectic composition forms quickly, flows into areas where there are voids caused by surface irregularities, and upon cooling forms a superior bond. Bonds formed by the present invention will generally withstand temperatures higher than the bonding temperature, which many conventionally brazed pieces will also do. This is probably due to the formation of higher-melting materials by alloying. That superior bonds are in fact formed by the method of the invention is clear from the Examples set forth below. This data establishes the utility of the invention without reliance on the explanations therefor set forth hereinabove

EXAMPLES

As examples of the effectiveness of the methods of this invention, initial test lots comprising 2,500 complete sets of rivet and disc components were processed as follows:

1. The first lot of 2,500 copper rivets was carefully chemically cleansed in a cyanide solution, washed, then dried and placed immediately in suitable carbon fixtures directly on top of previously chemically cleaned fine silver discs.

2. The second lot of 2,500 copper rivets were intentionally first oxidized in air for a period of two hours at 700° F., then placed on top of fine silver discs from the same lot as those in (1) above.

3. The third lot of 2,500 copper rivets were first cleaned in cyanide, and electrolytically plated with fine silver 0.0001 inch thick. The plated rivets were than deliberately oxidized in air for 2 hours at 700° F., and superimposed on fine silver discs taken from the same lots as (1) and (2) above.

All three lots were then placed on the moving belt of a continuous furnace, thereby moving into and through the heating zone and cooling zone of this furnace at the same lineal speed of 12 inches per minute. The heating zone of this particular furnace was 36 inches and the temperature was regulated at 1,590° ± 5° F. The ambient (reducing) atmosphere was dissociated ammonia ($NH_3$) with a dewpoint of minus 50° F. The entire time cycle from the initial placement to the travel through the furnace and exit in the cooling zone after cooling was 12 minutes.

Upon examination none of the copper to silver parts from the (non-oxidized) first lot were brazed together. Approximately 30 out of 2,500 of the copper rivets were apparently attached to the silver discs, but readily separated when they were dropped into a pan.

The preoxidized copper rivets from lot (2) were found to have approximately 88 percent (2,216) out of the original 2,500 permanently united. The bonded silver discs could not be separated from the copper rivets by squeezing (deforming) in a vise until they were less than 50 percent of their original diameter, or by use of a chisel, or by pounding flat, edgewise. The bonds of this lot were equal if not stronger than a normal silver solder brazed bond.

In lot (3) (2 hours pre-oxidized copper plus 0.0001 silver-plate), 2,496 out of 2,500 of the silver discs were firmly and permanently united to the copper rivets. Mechanical tests including the use of a chisel, a vise, and a flatting by hammer, proved it was impossible to separate the silver discs from the copper rivets. Rotary (Shear) tests reached higher values than those obtained on normally silver solder brazed assemblies.

As a further test the 2,500 non-bonded copper rivets from lot (1) were then silver plated 0.0001 inch and oxidized for 2 hours in air at 700° F. and run through the same furnace at the original belt speed 12 inches per minute in dissociated ammonia at the original 1,590° F. temperature. Upon examination 2,486 parts were now found satisfactorily bonded or brazed.

In subsequent tests, the following metals and alloys were successfully bonded to oxidized, silver plated copper rivets:

coin silver
sterling silver
90% Ag, 10% Fe
90% Ag, 10% Ni
75% Ag, 24.5% Cu, 0.5% Ni
40% W, 60% Ag
50% Ag, 50% Mo
90% Ag, 10% CdO The thermal bonding cycles used to successfully bond these materials are set forth below in Table I. In all instances, bonds were 100 percent acceptable. In all cases, the copper rivets were initially degreased, fine silver plated to a thickness of 0.0001 inch, and oxidized in air for 2 hours at 675°–725° F. The rivets were loaded into jigs on top of previously placed discs of the specified metal or alloy. The furnace atmosphere was either hydrogen or dissociated ammonia. Three furnaces were used in carrying out the tests, each with a different rating and length of heating and cooling zones, so different cycles had to be determined for each furnace. Furnace characteristics are given in Table II.

TABLE I—HEATING CYCLES

| Contact Facing Material | Furnace A | | Furnace B | | Furnace C | |
|---|---|---|---|---|---|---|
| | Temp. | Belt Speed (inches per min.) | Temp. | Belt Speed (inches per min.) | Temp. | Belt Speed (inches per min.) |
| Fine Ag | 1480–1500 | 8 | 1530–1540 | 8 | 1530–1540 | 10 |
| | 1530–1540 | 10 | 1580–1600 | 9 | 1550–1600 | 12 |
| | 1550–1600 | 12½ | 1610–1640 | 10 | 1620–1630 | 13 |
| | 1610–1620 | 15 | 1650–1670 | 12 | 1640–1690 | 14 |
| Coin and Sterling Ag | 1480–1500 | 9 | 1530–1540 | 9 | 1530–1550 | 10 |
| | 1530–1540 | 11 | 1580–1600 | 9½ | 1550–1600 | 12½ |
| | 1550–1560 | 13 | 1610–1640 | 10½ | 1620–1630 | 13½ |

TABLE I — HEATING CYCLES — Continued

| Conmet 17... | 1450-1480 | 9 | 1450-1480 | 9½ | 1450-1480 | 11 |
|---|---|---|---|---|---|---|
| | 1485-1500 | 10 | 1485-1500 | 10 | 1490-1500 | 13 |
| Conmets: #20-30-37 #42-43-44 #45-68-80 #81-84-86 | Same as fine silver. | | | | | |
| Conmets #61 & 62 | 1520-1540 | 9 | 1530-1545 | 9½ | 1540-1580 | 10 |
| | 1560-1580 | 10 | 1560-1585 | 10 | 1590-1610 | 11 |
| Conmets #71 & 72 | 1475-1490 | 10 | 1475-1490 | 10 | 1500-1520 | 11 |
| | 1460-1475 | 13 | 1460-1475 | 12 | 1470-1490 | 13 |

TABLE II — FURNACE CHARACTERISTICS

| Furnace | Make | Type | N.W. Rating (ph.) | Belt Width (inches) |
|---|---|---|---|---|
| A | C. I. Hayes | BAL.-M | 30-3 | 6 |
| B | Sargent & Wilbur | CAW-030228 | 8-1 | 3 |
| C | do | CEW-3212 | 4.5-1 | 3½ |

Understanding of the invention will be facilitated by consideration of bonding in other than the silver-copper system. Copper can be bonded to copper provided that at least one workpiece is silver plated in the bond area, and at least one workpiece, which will be the unplated workpiece if there is one. Bonding is carried out in hydrogen or cracked ammonia for 5 to 30 minutes in a temperature range of 1,000° to 1,850° F. It is of interest to note that the intensity of the bonding cycle (the product of time and temperature) appears to be proportional to the total volume of the bodies to be, to obtain the best bonds. It is not known why this is so.

Copper or silver may be readily bonded to nickel-plated steel in accordance with the invention, and several procedures can be followed. It is preferred to flash silver plate or copper-plate the nickel-plated steel, then oxidize it in air at 650°-900° F. for 45-90 minutes. Alternatively, bonds between silver- and nickel-plated steel can be made by first flash copperplating the silver and oxidizing this piece at 650°-800° F. for 2 hours. While the foregoing procedures are preferred, the following materials have been bonded to both nickel-plated steel and non-plated, intentionally oxidized steel: oxidized copper, oxidized sterling silver, coin silver and Conmet No. 4. Silver-cadmium oxide alloys (85/15 and 90/10) have been bonded to oxidized copper, silver-plated copper (also oxidized) and to nickel-plated steel which was subsequently copper-plated, silver-plated and oxidized at about 750° F. for 1-2 hours. When bonding silver to copper, it was found that tin plating could be substituted for the silver plating on the copper with good results. There are, of course, many silver-tin brazing alloys, but this does not explain the beneficial effects of intentional oxidation followed by bonding in a reducing atmosphere. Another system very similar to brazing bonds nickel-plated steel to tungsten. The plated steel is copper- and silver-plated and then oxidized. Upon bonding an Ag-Cu-Ni alloy forms which adheres to but does not detectably alloy with either workpiece.

Bonds can be made to Aluminum, a metal with a natural oxide coating, as follows: To bond silver to aluminum, the silver should be copper-plated and oxidized. To bond copper to aluminum, the copper should be silver-plated and oxidized (30 minutes at 600° F. was sufficient). Also, bonds in either system have been made by silver- and copper-plating the aluminum, oxidizing the plated piece at 450° F. for 2 hours. Bonding cycles are as previously stated, but care must be exercised not to exceed the melting point of aluminum.

In still other tests, three metal component type contacts comprising fine silver on copper on fine silver readily and reproduceably produced 100 percent acceptable bond strengths.

While it has been stated hereinabove that one or both of the workpieces may be oxidized prior to bonding, there are certain instances when it is definitely preferable to oxidize both. However, it is necessary to keep the amount of oxide formed small, i.e. shorter (or less intense) oxidation cycles are used. When bonding silver-cadmium oxide alloys to copper, it is best to both silver plate and oxidize the copper, and copper plate and oxidize the Ag/CdO. This results in stronger bonds, it is believed, because the CdO itself is slower to reduce during the reduction cycle.

Another advantage of the present invention is as follows: When brazing with conventional solder the overall head thickness of composite parts will vary in thickness in a range of from 0.0015 inch to at least 0.005 inch more than that of the original components due to the changes in the flow characteristics of the brazing materials plus their wetting and/or alloying actions with the components which they are uniting. Insofar as can be presently determined when using the teachings of this invention, the increase in thickness variation is always less than 0.001 inch maximum.

Furthermore, careful cross-sectioning shows that the interfacial bonded areas produced by the use of the invention comprise 95-100%, whereas normal brazing with brazing alloys shows a number of small voids and conventional brazing is usually considered acceptable when and if 70-80 percent of the contiguous interfacial area is brazed. The extra electrical and mechanical strengths and conductivity, both thermal and electrical, which are obtained are decided advantages over conventional brazing techniques.

While the invention has been described with primary reference to the production of composite rivet contacts, it has obvious application to the production of screw and projection welding contacts, strip materials, inlays, overlays, toplays, edge lays, spaced contacts on sheets (for subsequent blanking and forming) clad wires, diodes and joining ceramics and metals. In the latter instance, a ceramic insulator is silver clad by warming an ammoniacal silver nitrate solution to 150° F., and then adding formaldahyde or formic acid. The clad layer is baked at 1,300° to 1,400° F. and the unit is copper plated 0.0001 inch. The copper is oxidized for 2 hours at 900° F. and bonding then proceeds in accordance with the invention.

As used in the appended claims "nominally clean" metal is defined as metal with gross surface contaminants removed but which has not necessarily been subjected to chemical, mechanical, ultrasonic or other elaborate cleaning procedures required by the prior art. The term "juxtaposed" is defined as the workpieces being in surface contact over the intended bond area, without any clamping pressure necessarily being applied (of course, in many instances the workpieces may not be self-supportive, and some sort of clamping will be required to hold them in juxtaposition).

Various changes in the details, steps, materials, and arrangements of parts, which have been herein described and illustrated in order to explain the nature of the invention, may be made by those skilled in the art within the principle and scope of the appended claims and their equivalents.

What is claimed is:

1. A process for bonding metallic surfaces together by heating said surfaces when in juxtaposition to each other comprising:
   degreasing said surfaces to clean same;
   initially oxidizing at least one of said cleaned surfaces by heating to less than about 1,000° F. in a free-oxygen containing atmosphere;
   juxtaposing said surfaces; and
   heating in an atmosphere reducing to the oxide formed in said oxidizing step to reduce the oxide and bond said juxtaposed surfaces.

2. A process for bonding a pair of metallic surfaces together comprising:
   degreasing said surfaces to clean same;
   oxidizing at least one of said cleaned surfaces by heating to less than about 1,000° F. in a free-oxygen containing atmosphere;

juxtaposing said surfaces;
heating said surfaces to a bonding temperature in an atmosphere capable of reducing the oxide formed in said oxidizing step;
the intensity of said heating being sufficient to bond said surfaces.

3. The process as claimed in claim 2, wherein said surfaces are on a pair of workpieces, and said workpieces are selected from the group consisting of metals and metallized and plated ceramics.

4. The process as claimed in claim 3, wherein one of said workpieces is a metallic body having no more than about 0.0001 inch of a second metal plated at least on said surface.

5. The process as claimed in claim 4, wherein the other of said workpieces is a body of said second metal.

6. The process as claimed in claim 5, wherein said first workpiece and said second workpiece are made of eutectic-forming metals, and said heating is carried out at a temperature above their eutectic temperature but below the melting point of either metal 7. The process as claimed in claim 4, wherein the other of said workpieces has a plated metallic surface comprising one or more layers no more than about 0.0001 inch thick, the surface of one workpiece being capable of alloying with the surface of the other workpiece during bonding.

8. A process for bonding nominally clean metals, said metals comprising a first workpiece and a second workpiece, said process comprising the steps of:
degreasing said workpieces to clean same;
heating at least one of said cleaned workpieces to less than about 1,000° F. in a free-oxygen containing atmosphere for a period and at a temperature sufficient to form an oxide coating on said workpiece or workpieces.
juxtaposing said first and second workpieces over the desired bond area;
heating said first and second workpieces in an atmosphere capable of reducing said oxide and at a temperature sufficient to form a minor proportion of a liquid phase in said bond area;
said second heating having a duration sufficient to form a bond between said workpieces; and
cooling the bonded workpieces in an atmosphere that prevents reoxidation thereof.

9. The process as claimed in claim 8, wherein said workpieces are of dissimilar metals forming a eutectic, and said second heating is carried out at a temperature below the melting point of either of said workpieces but above the eutectic temperature of the binary system formed thereby, whereby said liquid phase is formed only in said desired bond area.

10. The process as claimed in claim 9, wherein one of said workpieces is provided, at least on the desired bond surface, with a thin coating of the metal of said other workpiece, prior to said oxidation step.

11. The process as claimed in claim 9, wherein one of said workpieces is copper or a high-copper alloy, and said first heating step is carried out in air with an intensity equal to 2 hours at a temperature of about 700° F.

12. The process as claimed in claim 11, wherein the other of said workpieces is silver or a silver alloy, and additionally comprising coating said copper workpiece with a thin coating of silver prior to said oxidation step.

13. A process for bonding first and second workpieces, said first workpiece being selected from the group consisting of copper, nickel, iron and alloys of copper, nickel and iron, said second workpiece being selected from the group consisting of silver and a silver alloy, said process comprising the steps of:
degreasing said workpieces to clean same:
heating said first, cleaned workpiece to less than about 1,000° F. in a free-oxygen containing atmosphere for a period and at temperature sufficient to form an oxide coating on said first workpiece;
juxtaposing said first and second workpieces over the desired bond area;
heating said workpieces in an atmosphere capable of reducing said oxide and at a temperature in the range of about 1,400° to 1,600° F.;
said second heating having a duration sufficient to bond the workpieces over at least 90 percent of the interfacial bond area; and
cooling the bonded workpieces in a protective atmosphere which prevents reoxidation of the workpieces.

14. The process as claimed in claim 13, and additionally comprising plating said first workpiece with about 0.0001 inch of silver prior to said oxidation step.

15. The process as claimed in claim 13, wherein said oxidation is carried out by heating in air with an intensity equal to 700° F. for about 2 hours.

16. The process as claimed in claim 13, wherein said first workpiece is iron or steel, and additionally comprising nickel-plating at least the desired bond area prior to said oxidation step.

17. The process as claimed in claim 16, and additionally comprising silver- or copper-plating said nickel-plated workpiece prior to said oxidation step.

18. A process for bonding a refractory metal workpiece to a second metal workpiece comprising:
degreasing said workpieces to clean same;
providing on said cleaned workpieces in at least the bond area at least two plated layers of metals capable of alloying under bonding conditions;
heating at least one of said workpieces in a free-oxygen containing atmosphere for a period and at a temperature sufficient to form an oxide coating thereon but less than about 1,000° F.;
juxtaposing said workpieces over the desired bond area;
heating said workpieces in an atmosphere capable of reducing said oxide and at an intensity sufficient to alloy said layers; and
cooling the bonded workpieces in a protective atmosphere.

* * * * *